Patented Sept. 26, 1950

2,523,613

UNITED STATES PATENT OFFICE 2,523,613

MANUFACTURE OF TETRAETHYL PYROPHOSPHATE

Michael N. Dvornikoff, St. Louis, and Henry Leighton Morrill, Clayton, Mo., assignors to Monsanto Chemical Company, St. Louis, Mo., a corporation of Delaware No Drawing. Application May 3, 1948, Serial No. 24,918

7 Claims. (Cl. 260—461)

This invention relates to a process for the manufacture, concentration and recovery of tetraethyl pyrophosphate. More particularly, this invention relates to a method of separating and recovering tetraethyl pyrophosphate from the mixtures of reaction products from the processes by which tetraethyl pyrophosphate is made.

Compositions containing tetraethyl pyrophosphate are widely used as agricultural economic poisons, particularly against many insects such as aphids and against many acarina such as the red spider mites, however, such compositions may be used generally against the lower forms of life which, in the past, have been combatted by the use of nicotine or nicotine salts. Furthermore, tetraethyl pyrophosphate has been found useful in the preparation of insectivoricide and rodenticide compositions. In addition, there appear to be many new and advantageous uses of tetraethyl pyrophosphate if substantially pure tetraethyl pyrophosphate were readily available in commercial quantities.

While the art has disclosed several methods for the preparation of tetraethyl pyrophosphate, most of these methods are of interest only from a purely academic and theoretical view point. It has become known to the art that when phosphorus oxychloride is reacted with the neutral triethyl ester of orthophosphoric acid in a mol ratio of about 1:3 at temperatures of about 130° C. to 150° C., that the resulting mixtures of reaction products contain about 10-15% of tetraethyl pyrophosphate. Moreover, it is disclosed in U. S. application No. 24,682, filed May 1, 1948, by Harris that the mixtures of reaction products from the reaction of triethyl phosphate and phosphorus oxychloride in the mol ratio of substantially 5:1 at temperatures of 130° C. to 145° C. contain substantially 40% tetraethyl pyrophosphate. However, prior to the present invention there has not been described in the art a practical commercial process for the production and recovery of substantially pure tetraethyl pyrophosphate. Up to this time it has been customary to use the mixtures of reaction products containing the tetraethyl pyrophosphate without any attempt to separate the tetraethyl pyrophosphate from the mixtures of reaction products. There are many instances where it has become highly desirable, even necessary, to have higher concentrations of tetraethyl pyrophosphate than even the 40% concentrations produced by Harris. It is extremely difficult and tedious to separate the tetraethyl pyrophosphate from the mixtures of reaction products, and the most-often tried method, in the laboratory, has been the attempted recovery of tetraethyl pyrophosphate by fractional distillation of the mixtures of reaction products. However, such fractional distillations of the reaction mixtures must be carried out under low pressures of a fraction of a millimeter of mercury, in no case more than one millimeter of mercury, as decomposition of the tetraethyl pyrophosphate apparently takes place in the presence of the other reaction product at temperatures required for distillation under pressures greater than one millimeter of mercury. In many instances, severe decomposition problems are encountered even when fractional distillation of the reaction mixtures are attempted at pressures below one millimeter of mercury.

It is an object of this invention to provide a method for the preparation and recovery of substantially pure tetraethyl pyrophosphate. A further object of this invention is to provide a method for the separation and recovery of the tetraethyl pyrophosphate contained in the mixtures of reaction products from processes for the manufacture of tetraethyl pyrophosphate and which reaction mixtures are relatively dilute with respect to tetraethyl pyrophosphate.

In the practice of this invention, the mixture of reaction products containing tetraethyl pyrophosphate is cooled to room temperature and is stirred into water at substantially 30° C. to effect a selective hydrolysis of the higher polyphosphates. While the hydrolysis may be effectively carried out in the water alone, it is preferred to hydrolyze the higher polyphosphates in an aqueous solution at 30° C. containing about 9% sodium chloride. The presence of up to 9% sodium chloride aids in the "salting out" of the tetraethyl pyrophosphate and therefore tends toward a more efficient solvent extraction of the tetraethyl pyrophosphate. Aqueous solutions containing more than about 9% sodium chloride are not preferred for use in the hydrolysis step because concentrations greater than 9% of sodium chloride result in an increased extraction, by the solvent, of the diethyl acid phosphate formed as a hydrolysis product. The selective hydrolysis of the higher polyphosphates (i. e. polyphosphates above the pyrophosphate) is substantially complete, with only a minimal hydrolysis (of the order of 1%) of the tetraethyl pyrophosphate, in about five minutes when the hydrolysis solution is maintained at 30° C. The same amount of hydrolysis of the tetraethyl pyrophosphate (of the order of 1%) is obtained when the hydrolysis is carried out at a temperature of 25° C. for a period of time of about ten minutes. Thereafter, the aqueous solution containing the reaction products is extracted with a preferential solvent such as benzene, toluene, monochlorobenzene or carbon tetrachloride, however, monochlorobenzene is preferred. Chloroform was also tried as the extractive solvent. However, chloroform is undesirable because of its tendency to extract excessive amounts of ethyl metaphosphate, diethyl acid phosphate and other acidic hydrolysis products. However, when benzene, toluene or monochlorobenzene is used, most of the diethyl ester remains in the aqueous salt layer together with the other acidic hydrolysis products and ethyl metaphosphate. The solvent layer contains tetraethyl pyrophosphate, triethyl phosphate and a small amount of diethyl acid phosphate.

The solvent extract may be given a wash with dilute sodium carbonate solution to remove the small amount of diethyl acid phosphate extracted from the reaction mixture along with the tetraethyl pyrophosphate and triethyl phosphate. After the sodium carbonate wash, the solvent extract then consists of tetraethyl pyrophosphate, triethyl phosphate and the selected solvent.

As pointed out heretofore, the mixtures of reaction products for the production of tetraethyl pyrophosphate from the reaction of triethyl phosphate and phosphorus oxychloride contain higher polyphosphates in addition to the pyrophosphate ester. When the recovery of tetraethyl pyrophosphate from the mixtures of reaction products is attempted by means of a vacuum fractional distillation of the reaction mixtures, extreme problems of decomposition are often encountered, even when the pressure is maintained below one millimeter of mercury. It is believed that the higher polyphosphates are quite susceptible to thermal decomposition, and that these higher polyphosphates do decompose readily at the temperatures required for the vacuum distillation of the reaction mixtures to recover the tetraethyl pyrophosphate. Moreover, the decomposition products of the polyphosphates seem to catalyze the decomposition of the tetraethyl pyrophosphate during the vacuum distillation.

In the practice of this invention, the above described decomposition problems during the fractional distillation are substantially eliminated, as the solvent layer containing the tetraethyl pyrophosphate and triethyl phosphate is free of the higher polyphosphates which contribute to the decomposition during the distillation process.

The solvent extract containing the tetraethyl pyrophosphate and triethyl phosphate, may be fractionally distilled with a minimum decomposition problem to recover the solvent as the first fraction, the triethyl phosphate as the second fraction and the residue which is substantially pure tetraethyl pyrophosphate. The residue may be distilled if a colorless product is desired.

Example I 182.2 g. of triethyl phosphate were placed in a glass reaction vessel equipped with a reflux condenser. The triethyl phosphate was warmed to 130° C., at atmospheric pressure, and 30.7 g. of phosphorus oxychloride (mol ratio 5:1) were gradually added, with stirring, to the warmed triethyl phosphate at such a rate so as to maintain a reaction temperature of about 130° C., which required about two hours. Ethyl chloride was evolved from the reaction mixture upon the addition of the phosphorus oxychloride to the triethyl phosphate and the rate of addition of phosphorus oxychloride was controlled so as to prevent excessive frothing of the reaction mixture. After all of the phosphorus oxychloride had been added to the triethyl phosphate and the cessation of bubbling had indicated that the evolution of ethyl chloride had ceased, the reaction mixture was then heated over a period of one hour to about 145° C. and thereafter maintained at 145° C. for an additional two hours. Quantitative chemical analysis of the reaction mixture indicated a 43.6% content of tetraethyl pyrophosphate.

150 g. of the above reaction mixture were stirred into 600 ml. of a 9% aqueous sodium chloride solution at 30° C. The solution was allowed to stand for five minutes, at the end of which time 200 ml. of monochlorobenzene were added and the mixture vigorously agitated for about one minute. Upon stopping the agitation, the monochlorobenzene layer and an aqueous layer formed, and the layers were separated by decantation. The aqueous layer was extracted a second time with an additional 100 ml. of monochlorobenzene. The monochlorobenzene layers from the first and second extractions were combined and washed with 250 ml. of an aqueous solution containing 5% sodium carbonate to remove any acid partial esters which may have been extracted by the monochlorobenzene.

After washing, the monochlorobenzene phase was fractionally distilled under reduced pressures in order that the pot temperatures could be maintained below the allowable maximum temperature of 120° C. It is preferred to employ such reduced pressures so that the fractionations may be carried out with a maximum pot temperature of 100–110° C. During the course of the fractional distillation, the monochlorobenzene is removed as the first fraction, the preponderance of the monochlorobenzene being removed at about 100 millimeters of mercury pressure and the final traces of monochlorobenzene being stripped at 10 millimeters of mercury pressure in order that a 100° C. pot temperature would not be exceeded; thereafter, triethyl phosphate was removed as a second fraction, the stripping of the triethyl phosphate being substantially complete when the pot temperature was 110-120° C. at 1 to 2 millimeters of mercury pressure. The residue which remained in the pot of the fractionating column was substantially pure tetraethyl pyrophosphate. Quantative chemical analysis of this residue indicated a 98% content of tetraethyl pyrophosphate and a recovery of 96% of the tetraethyl pyrophosphate which was originally present in the reaction mixture. No decomposition problems were encountered during the stripping of the monochlorobenzene and the triethyl phosphate from the tetraethyl pyrophosphate.

Example II 546.6 g. of triethyl phosphate (3 mols) were placed in a glass reaction vessel equipped with a reflux condenser. The triethyl phosphate was warmed to 130° C., at atmospheric pressure, and 153.4 g. of phosphorus oxychloride (1 mol) were gradually added, with stirring, to the warmed triethyl phosphate at such a rate so as to maintain a reaction temperature of about 130° C. This required about two hours. After all of the phosphorus oxychloride had been added to the triethyl phosphate, the reaction mixture was then slowly heated to 145° C. over a period of one hour and maintained at 145° C. for an additional hour. Thereafter, this reaction mixture was cooled to 130° C. and 364.4 g. of triethyl phosphate (2 mols) were slowly added to the reaction mixture at such a rate so as to maintain a reaction temperature of about 130° C. After all of the triethyl phosphate had been added, the temperature was raised to 145° C. over a period of one hour and thereafter, while the stirring of the reaction mixture was continued, the reaction mixture was held at 145° C. for an additional two hours. Quantitative chemical analysis of the reaction mixture indicated a 41.7% content of tetraethyl pyrophosphate.

This reaction mixture, after cooling to room temperature, was stirred into about 4 liters of a 9% aqueous sodium chloride solution at 30° C. The stirring was continued for five minutes, at the end of which time about 1.5 liters of benzene were added and the mixture vigorously agitated for about one-half minute. Upon stopping the agitation, the mixture separated into a benzene and an aqueous layer, and the layers were separated by decantation. The aqueous layer was extracted a second time with 750 ml. of benzene, and the benzene phases from the first and second extractions were combined. The combined benzene layers were then washed with one liter of an aqueous solution containing 5% sodium carbonate to remove any acid partial esters which may have been extracted from the aqueous layer by the benzene.

The washed benzene extract was then fractionally distilled, the benzene being removed under 300 millimeters of mercury pressure as the first fraction, the last traces of benzene having been removed when a pot temperature of 110° C. had been reached. After the first fraction containing the benzene had been removed, the triethyl phosphate was removed as the second fraction while the pressure was slowly reduced to one millimeter of mercury. The last traces of triethyl phosphate were removed when the pot temperature had reached 110° C. to 120° C. under a pressure of 0.5 millimeter of mercury.

The residue which remained in the pot of the fractionating column was an amber liquid analyzing 97% tetraethyl pyrophosphate. This indicated a recovery of 95% of the tetraethyl pyrophosphate originally present in the reaction mixture. No decomposition problems were encountered during the stripping of the benzene and the triethyl phosphate from the tetraethyl pyrophosphate.

The residue was then flash-distilled under 0.1 millimeter of mercury pressure to give a colorless product assaying 98% tetraethyl pyrophosphate.

Having described and set forth our invention in detail and having given examples showing the substantial advantages to be gained in the practice of our process over the processes of the prior art, we claim:

1. In a process for the manufacture of tetraethyl pyrophosphate by the reaction of phosphorus oxychloride with triethyl phosphate, the steps comprising adding phosphorus oxychloride to triethyl phosphate at substantially 130° C. in the mol ratio of 1 mol of phosphorus oxychloride to substantially 5 mols of triethyl phosphate and thereafter maintaining the temperature at substantially 145° C. for 1 to 5 hours to form a reaction mixture containing tetraethyl pyrophosphate, cooling said reaction mixture to substantially room temperature, dissolving said reaction mixture in an aqueous substantially 9% sodium chloride solution at a temperature of substantially 30° C., permitting the aqueous solution to hydrolyze for substantially 5 minutes, extracting the aqueous solution of hydrolysis products with monochlorobenezene, separating the monochlorobenzene and aqueous phases, washing said monochlorobenzene phase with dilute sodium carbonate solution, fractionally distilling said monochlorobenzene phase and recovering the tetraethyl pyrophosphate from the fractional distillation step.

2. In a process for separating tetraethyl pyrophosphate from a mixture comprised predominantly of triethyl phosphate, tetraethyl pyrophosphate and higher polyphosphates, the steps comprising preparing an aqueous solution of said mixture containing tetraethyl pyrophosphate at a temperature within the range of about 25° C. to 30° C. and for a period of time such that the hydrolysis of the tetraethyl pyrophosphate does not exceed about 1% and extracting said aqueous solution with a solvent selected from the group consisting of benzene, toluene, monochlorobenzene and carbon tetrachloride, separating the solvent and aqueous phases and fractionally distilling said solvent phase and recovering the tetraethyl pyrophosphate in a fraction therefrom.

3. The process comprising dissolving in water at substantially 30° C. a reaction mixture from a process for the preparation of tetraethyl pyrophosphate by the reaction of triethyl phosphate with phosphorus oxychloride to form the aqueous solution, about five minutes thereafter extracting said aqueous solution with a solvent selected from the group consisting of benzene, toluene, monochlorobenzene and carbon tetrachloride, separating the solvent and aqueous phases and fractionally distilling said solvent phase and recovering the tetraethyl pyrophosphate in a fraction therefrom.

4. In a process for the separation of tetraethyl pyrophosphate from a mixture composed essentially of triethyl phosphate, tetraethyl pyrophosphate and higher polyphosphates, the steps comprising dissolving said mixture containing tetraethyl pyrophosphate in an aqueous sodium chloride solution at substantially 30° C., about five minutes thereafter extracting the aqueous solution with a solvent selected from the group consisting of benzene, toluene, monochlorobenzene and carbon tetrachloride, separating the solvent and aqueous phases and fractionally distilling said solvent phase and recovering the tetraethyl pyrophosphate in a fraction therefrom.

5. A process for separating tetraethyl pyrophosphate from a mixture comprised predominantly of triethyl phosphate, tetraethyl pyrophosphate and higher polyphosphates, the steps comprising dissolving said mixture in an aqueous substantially 9% sodium chloride solution at a temperature of substantially 30° C., substantially five minutes thereafter extracting said aqueous solution with a water-immiscible solvent selected from the group consisting of benzene, toluene, monochlorobenzene and carbon tetrachloride, separating the solvent and aqueous phases, washing said solvent phase with dilute aqueous sodium carbonate solution, fractionally distilling said solvent phase and recovering the tetraethyl pyrophosphate in a fraction therefrom.

6. The process of claim 5 wherein monochlorobenzene is the selected solvent.

7. The process of claim 5 wherein benzene is the selected solvent.

MICHAEL N. DVORNIKOFF.
HENRY LEIGHTON MORRILL.

REFERENCES CITED

The following references are of record in the file of this patent:

UNITED STATES PATENTS

| Number | Name | Date |
|---|---|---|
| 2,402,703 | Woodstock | June 25, 1946 |

OTHER REFERENCES

Clermont, "Annalen der Chemie," vol. 91 (1854), pp. 375–376.

Cavalier, "Comptes rendus," vol. 142 (1906), pp. 885 to 887.

Rosenheim et al., "Ber. deutsch. chem. Ger.," vol. 41 (1908), pp. 2708 to 2711.

Balarew, "Zeit. anorg. allgem. Chem.," vol. 99 (1917), page 191.